(12) United States Patent
Murray

(10) Patent No.: US 7,784,448 B2
(45) Date of Patent: Aug. 31, 2010

(54) FUEL FLOW ANTI-INTERRUPTION

(75) Inventor: Stephen G. Murray, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 8 days.

(21) Appl. No.: 12/150,054

(22) Filed: Apr. 24, 2008

(65) Prior Publication Data

US 2009/0266078 A1 Oct. 29, 2009

(51) Int. Cl.
*F02M 37/00* (2006.01)
*F02M 37/20* (2006.01)

(52) U.S. Cl. ...................... 123/510; 123/516

(58) Field of Classification Search ............... 123/447, 123/467, 509, 510, 511, 516
See application file for complete search history.

(56) References Cited

U.S. PATENT DOCUMENTS

| | | | | | |
|---|---|---|---|---|---|
| 2,215,469 | A | * | 9/1940 | Janssen ................... | 123/516 |
| 2,612,215 | A | | 9/1952 | Edwards | |
| 2,952,214 | A | | 9/1960 | Adams | |
| 4,450,820 | A | * | 5/1984 | Haynes ..................... | 123/514 |
| 4,543,938 | A | | 10/1985 | Szlaga | |
| 4,589,395 | A | * | 5/1986 | Timms et al. ............ | 123/516 |
| 4,984,554 | A | * | 1/1991 | Ariga et al. ............. | 123/516 |
| 5,372,116 | A | * | 12/1994 | Davis ....................... | 123/516 |
| 5,490,387 | A | | 2/1996 | Bisson et al. | |
| 5,535,724 | A | * | 7/1996 | Davis ....................... | 123/467 |
| 6,155,237 | A | * | 12/2000 | Frank ....................... | 123/509 |
| 6,253,742 | B1 | * | 7/2001 | Wickman et al. ......... | 123/516 |
| 6,920,866 | B2 | * | 7/2005 | Leini et al. ............... | 123/514 |
| 7,093,437 | B2 | | 8/2006 | Spadaccini et al. | |
| 7,178,512 | B1 | * | 2/2007 | Merten ..................... | 123/516 |
| 7,591,248 | B2 | * | 9/2009 | Mizui et al. .............. | 123/468 |
| 2004/0003796 | A1 | * | 1/2004 | Nomura .................... | 123/461 |

* cited by examiner

*Primary Examiner*—Thomas N Moulis
(74) *Attorney, Agent, or Firm*—Krieg DeVault LLP; Matthew D. Fair, Esq.

(57) ABSTRACT

An anti-flow interruption system is configured to provide a supply of fuel in the event of a fuel flow interruption from a fuel tank. The anti-flow interruption system includes a reservoir, a reservoir conduit, and a vapor bleed system. The reservoir conduit has an end disposed at the bottom of the reservoir and another connected to a fuel pump. The vapor bleed system includes a vapor bleed conduit and a vapor bleed restrictor. One end of the vapor bleed conduit is attached to the top of the reservoir and the other end is connected to the fuel pump. The vapor bleed restrictor is disposed in the vapor bleed conduit between the fuel pump and the reservoir. If fuel flow is interrupted and results in vapor being present in the reservoir, liquid fuel remaining in the reservoir continues to be supplied to the fuel pump while the vapor bleed system removes the vapor.

20 Claims, 6 Drawing Sheets

FUEL FLOW ANTI-INTERRUPTION

BACKGROUND

The present invention generally relates to fuel systems, and more particularly, but not exclusively, to anti-flow interruption systems for gas turbine engines.

FIELD OF INVENTION

Configuring systems that provide for some level of anti-flow interruption remains an area of interest for operators and manufacturers of a variety of vehicles, such as aircraft to set forth one example. Unfortunately, some existing systems have various shortcomings relative to certain applications. Accordingly, there remains a need for further contributions in this area of technology.

SUMMARY

One embodiment of the present invention is a unique anti-flow interruption system useful in a fuel system. Other embodiments include apparatuses, systems, devices, hardware, methods, and combinations for fuel systems. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE REPRESENTATIVE EMBODIMENTS

Figure 1:
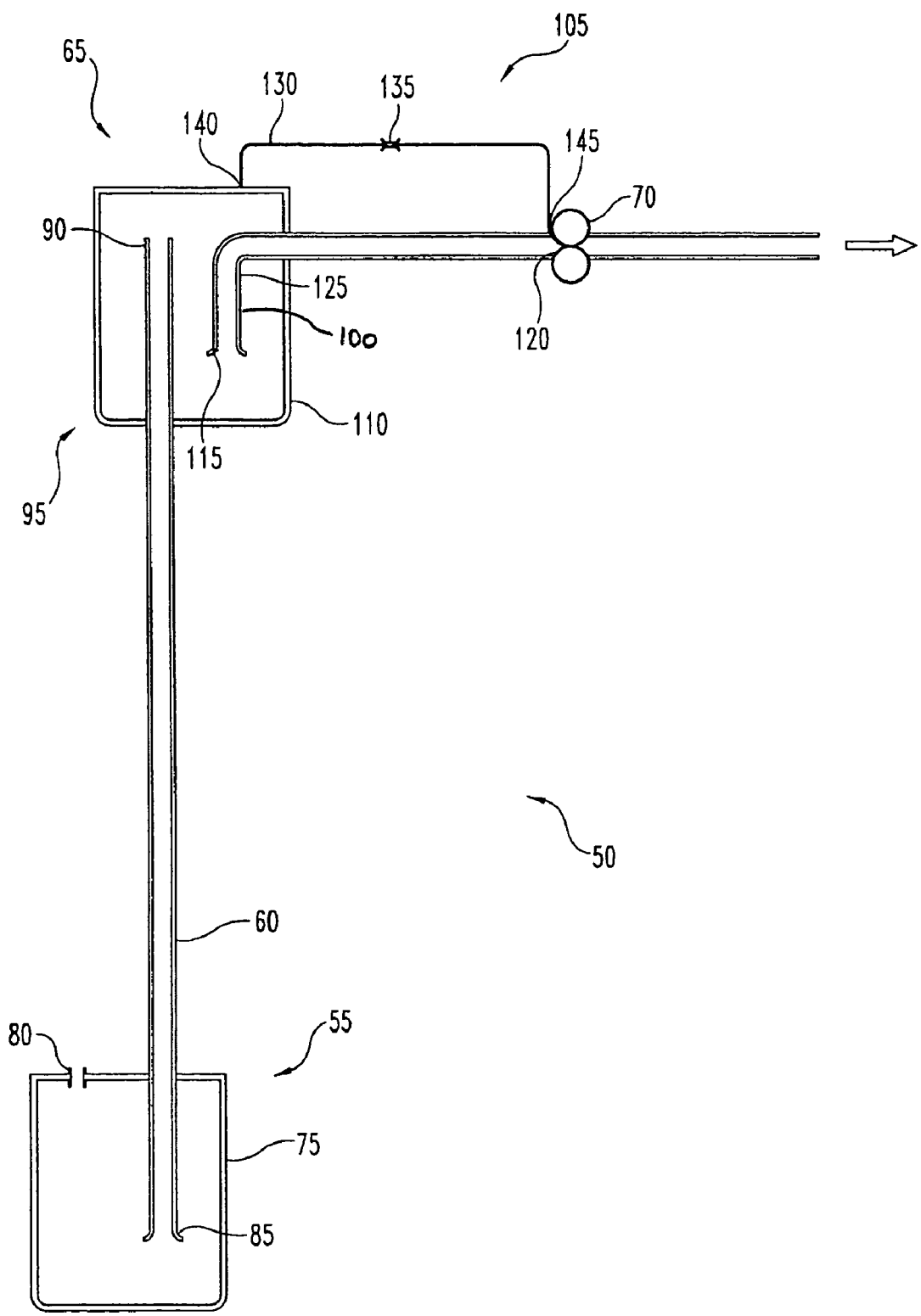
FIG. 1 is a schematic of an anti-flow interruption system configured with a fuel system.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

One embodiment of the present application is a fuel system having a pump positioned above a fuel tank. Interposed between the high lift suction pump and the fuel tank is an anti-flow interrupter which serves to supply fuel to the fuel pump in the event that the fuel flow from the fuel tank is interrupted. The fuel flow may be interrupted for many reasons. For example, a disturbance, such as a sudden change in pressure may cause the fuel to transition from liquid to vapor. Such a sudden change in pressure can occur, for example, if a portion of the liquid fuel is under partial vacuum conditions in a closed container that experiences a sudden change in normal acceleration, such as would be the case if the closed container were installed on a maneuvering aircraft. The anti-flow interrupter includes a reservoir that provides a source of liquid fuel to an engine even in the event of a fuel interruption. The anti-flow interrupter also includes a reservoir conduit and a vapor bleed that act to withdraw liquid fuel from the reservoir as well as withdraw fuel vapor, respectively.

With reference to FIG. 1 there is illustrated a fuel system 50 which includes a fuel tank 55, a fuel line 60, an anti-flow interrupter 65 and a fuel pump 70. The fuel system 50 provides fuel to an aircraft (not shown) or other motorized vehicle. The aircraft may be powered by, for example, a gas turbine engine. The term "aircraft" includes, but is not limited to, helicopters, airplanes, unmanned space vehicles, fixed wing vehicles, variable wing vehicles, rotary wing vehicles, hover crafts, vehicles, and others. Further, the present inventions are contemplated for utilization in other applications that may not be coupled with an aircraft such as naval propulsion to set forth just one non-limiting embodiment. The present inventions may also be used for stationary applications.

The fuel tank 55 is disposed vertically below the anti-flow interrupter 65 and the fuel pump 70. In one form the fuel tank 55 may be placed along an axis immediately below the anti-flow interrupter 65, while in other forms the fuel tank 55 may be located below the anti-flow interrupter 65 but displaced laterally to the side relative to a vertical axis that extends downwardly from the anti-flow interrupter 65. The fuel pump 70 is a suction type pump in the illustrative embodiment and is configured to operate in high lift conditions, i.e., at vertical distances requiring a motor sufficiently sized to pull fuel from a tank located some distance below the pump. The capabilities of the fuel pump 70 operating in a "high lift" configuration will have an appropriate vapor/liquid ratio as will be understood by those having skill in the art. In other embodiments the fuel pump 70 may not be a high lift pump. The anti-flow interrupter 65 is disposed intermediate the fuel tank 55 and the fuel pump 70 and is configured to supply fuel to an aircraft or other motorized vehicle.

The fuel tank 55 includes a tank wall 75 and a fuel vent 80 and is configured to hold a quantity of fuel sufficient for motor vehicle operations, such as the duration of an aircraft flight. The tank wall 75 forms rectangular contours of the fuel tank 55 in the illustrative embodiment, but may take on other forms in different embodiments. The tank wall 75 can be made in any shape and can be made from a variety of fuel-compatible materials. The fuel tank 55 may have bladders, baffles, or other devices useful for containing or restraining a liquid fuel. In some embodiments, more than one fuel tank 55 may be provided.

The fuel vent 80 is provided to permit passage of air and/or fuel vapor to and from the fuel tank 55 for fuel pumping operations. As fuel is drained from the fuel tank 55, the volume of drained fuel is replaced via the fuel vent 80 by an equal volume of air thus maintaining desired pressure conditions inside the fuel tank 55, assuming an adequate supply of air. The fuel vent 80 may receive ambient air, or alternatively, may receive pressurized air or other gas from an external source (not shown). The fuel vent 80 also allows air to escape the fuel tank 55 to avoid an overpressurization of the fuel tank.

For example, air can be vented from the fuel tank 55 in situations where an aircraft or other motorized vehicle containing the fuel system 50 were to ascend from low altitude (relatively high pressure) to high altitude (relatively low pressure), thus trapping relatively high pressure air in the fuel tank 55. High pressure trapped air may lead to rupture of the fuel tank 55 if not properly vented. In some embodiments, the fuel vent 80 may not be provided, such as in situations in which the initial volume of air contained in the fuel tank 55 is much greater than the initial volume of fuel, thus ensuring a minimal drop in air pressure in the fuel tank 55 as fuel is withdrawn. Other situations may also be provided in which the fuel vent 80 is not needed.

The fuel line 60 extends from the fuel tank 55 and includes a fuel tank end 85 and an anti-interruption end 90. The fuel tank end 85 may be placed anywhere relative to the fuel tank 55 to receive fuel from the fuel tank. In many embodiments, the fuel tank end 85 is located near the low part of the fuel tank 55 to have access to as much fuel as possible. In the illustrative embodiment, the fuel tank end 85 is disposed within the fuel tank 55. In other embodiments, the fuel tank end 85 may be defined in the tank wall 75 such that the fuel line 60 may be entirely disposed exterior to the fuel tank 55. Fuel is conveyed from the fuel tank 55 by the fuel line 60 to the anti-flow interrupter 65. The fuel line 60 is generally tubular in shape, but may take other forms in other embodiments. The fuel line 60 may be composed of many segments in some embodiments. In many if not most situations, the configuration of the fuel line 60 may result in some amount of measurable pressure loss when fuel is flowing. A filter may be placed in the fuel tank end 85 to prevent foreign particulate matter from progressing toward the fuel pump 70. In other embodiments, the filter may be placed elsewhere in the various embodiments disclosed herein. The fuel line 60 may be made of suitable materials and may include one or more bends, depending on the needs of the particular application.

The anti-flow interrupter 65 includes a reservoir 95, a reservoir conduit 100, and a vapor bleed system 105 and is configured to supply fuel to the fuel pump 70. In some embodiments, the anti-flow interrupter 65 may provide 5 to 10 seconds of continued engine operation after the interruption, but other durations are also contemplated. The total duration of continued operation is determined by the size of the reservoir 95 as well as the fuel flow rate demanded by a particular engine operating condition. In some embodiments, the anti-flow interrupter 65 may include fewer than all parts depicted in the illustrative embodiment, as will be described further hereinbelow. The anti-flow interrupter 65 may be located at any height above the fuel tank 55 and may also be located at heights above the fuel pump 70.

The reservoir 95 is configured to hold a quantity of fuel sufficient for certain motor vehicle operations, which may include the entire duration of a maneuvering aircraft flight. A reservoir wall 110 forms a rectangular contour of the reservoir 95 in the illustrative embodiment, but may take on different shapes in other embodiments. For example, the reservoir wall 110 may form a pyramid-like shape having a wide base to provide a large quantity of fuel at the bottom of the tank relative to the top. The reservoir wall 110 can be made from a variety of fuel-compatible materials. Furthermore, the reservoir 95 may have bladders, baffles, or other devices useful in containing and restraining the liquid fuel.

The reservoir conduit 100 extends from the reservoir 95 and includes a first reservoir conduit end 115 and a second reservoir conduit end 120. Though the reservoir conduit 100 is depicted as a single conduit, some embodiments may include multiple conduits and connections that together form the reservoir conduit 100. The reservoir conduit 100 extends laterally from the side of the reservoir 95, but may also extend from the top or bottom as well. The reservoir conduit 100 conveys fuel from the reservoir 95 to the fuel pump 70 and is generally tubular in shape, but different shapes are also contemplated in other embodiments. The reservoir conduit 100 is made of suitable materials depending on the needs of the particular application.

The first reservoir conduit end 115 is located near the bottom of the reservoir 95 in the illustrative embodiment to capture fuel in a liquid state. In other embodiments, however, the first reservoir conduit end 115 may be located elsewhere. For example, the first reservoir conduit end 115 may be defined in a wall of the reservoir 95. The conduit end 115 is generally located below the anti-interruption end 90 of the fuel line 60 and in many embodiments is near the bottom of the reservoir 95. The anti-interruption end 90 may be disposed within the reservoir 95 as depicted in the illustrative embodiment, or may be defined in a wall of the reservoir 95, to set forth just one alternative location among potential others. Fuel is conveyed to the fuel pump 70 via the reservoir conduit 100 and includes a bend 125 in the illustrative embodiment. In other embodiments, the reservoir conduit 100 may have no bends, and in still other embodiments the reservoir conduit 100 may have more than one bend. In still other embodiments, the bend 125 may be outside of the reservoir 95. In still further embodiments, the first reservoir conduit end 115 may have a filter placed therein to block foreign particulate matter from progressing toward the fuel pump 70.

The second reservoir conduit end 120 is in fluid communication with the fuel pump 70 and serves to convey fuel from the reservoir 95. The second reservoir conduit end 120 may have a filter placed therein to block foreign particulate matter from progressing toward the fuel pump 70.

The vapor bleed system 105 includes a vapor bleed conduit 130 and a vapor bleed restrictor 135. The vapor bleed system 105 is used to withdraw air, fuel vapor, or other gas from the reservoir 95, such as when the fuel system 50 is used for the first time. Though the vapor bleed system 105 is configured to withdraw gas, it may also serve to discourage the withdrawal of liquid. In some embodiments, the vapor bleed system 105 may not be needed, such as would be the case when the majority of fuel has already been exhausted from the fuel tank 55. The vapor bleed system 105 may not be needed in other situations as well. For example, a valve connected to a supplemental pump may be provided to automatically remove fuel vapor or other gas when present in the reservoir 95, wherein the valve opens allowing the supplemental pump to extract the fuel vapor or other gas. In yet another example, the vapor bleed system 105 may not be necessary depending on, for example, the shape of the walls 110 of the reservoir 95 and the location of the anti-interruption end 90. The vapor bleed system 105 may maximize the storage of liquid fuel in the reservoir 95 and thus, in some embodiments, may not be necessary if lost storage capacity is tolerable.

A vapor bleed conduit first end 140 is attached to the top of the reservoir 95 and serves to withdraw air, fuel vapor, or other gas from the reservoir 95. In alternative embodiments the vapor bleed conduit first end 140 may be attached at other locations of the reservoir 95. A vapor bleed conduit second end 145 is attached to the fuel pump 70 and serves to convey at least air, fuel vapor, or other gas from the reservoir 95. In alternative embodiments, the vapor bleed conduit second end 145 may be attached to the reservoir conduit 100, such that the passage of liquid fuel through the reservoir conduit 100 may act to withdraw gas from the vapor bleed conduit 130 when gas is present.

The vapor bleed restrictor 135 is configured to encourage the passage of a gas without disabling the capability of the reservoir conduit 100 from drawing liquid fuel. The vapor bleed restrictor 135 acts by providing a restriction that narrows the cross-section of the vapor bleed conduit 130 sufficiently to maintain a pressure differential from the first reservoir conduit end 115 to the inlet to the pump 70. This differential is necessary to drive the liquid fuel from the reservoir 95 to the inlet to pump 70. Other configurations of the vapor bleed restrictors may also be used in other embodiments.

The fuel pump 70 provides energy to move fuel through the fuel system 50. The fuel pump 70 is configured as a high lift suction pump, but in other embodiments the fuel pump 70 need not be high lift. In still other embodiments, the fuel pump 70 can be any type of pump that serves to withdraw fuel from the fuel tank 55 and through the anti-flow interrupter 65. The fuel pump 70 may be laterally displaced from the fuel tank 55 and the reservoir 95, and may furthermore be located at any suitable height, including heights above the reservoir 95. The fuel pump 70 may work in conjunction with the air pressure present in the fuel tank 55, such that the air pressure in the fuel tank 55 provides assistive lift. The magnitude of the motive force available to pump liquid fuel is determined at least by the magnitude of air pressure inside the fuel tank 55, any pressure losses that may be inherent in the fuel system 50, such as losses through the fuel line 60, and the static pressure exerted by the column of liquid fuel in fuel line 60.

Turning now to FIGS. 2-5, wherein like numerals refer to like elements, a series of figures disclose the fueling sequence and operation of a fuel system having one embodiment of an anti-flow interruption system of the present invention.

Figure 2:
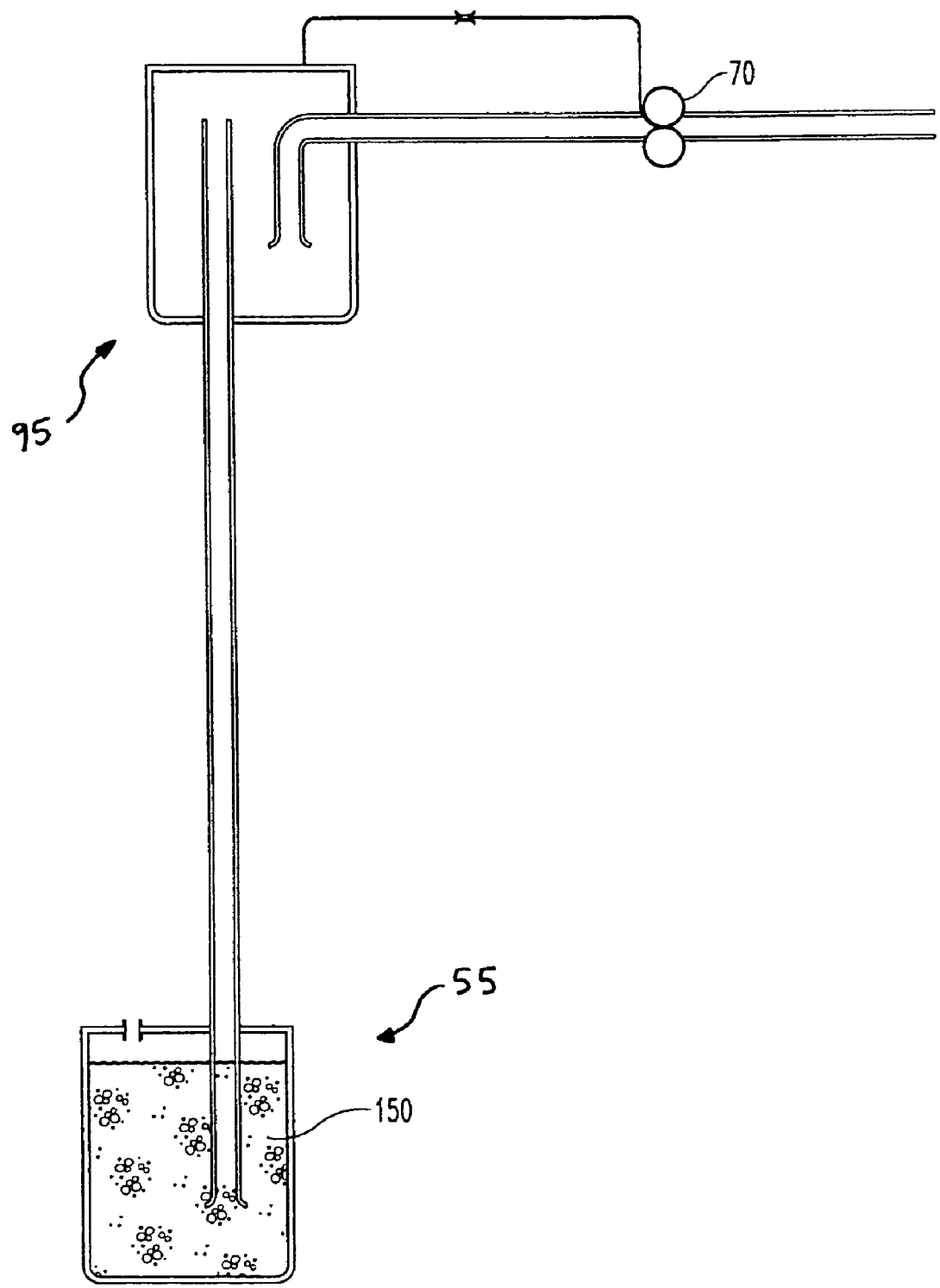
FIG. 2 is a schematic of an anti-flow interruption system configured with a fuel system prior to operation of a fuel pump.

FIG. 2 shows the fuel tank 55 filled with a liquid fuel 150 prior to the operation of the fuel pump 70. In some applications, fuel may also be preloaded within the reservoir 95.

Figure 3:
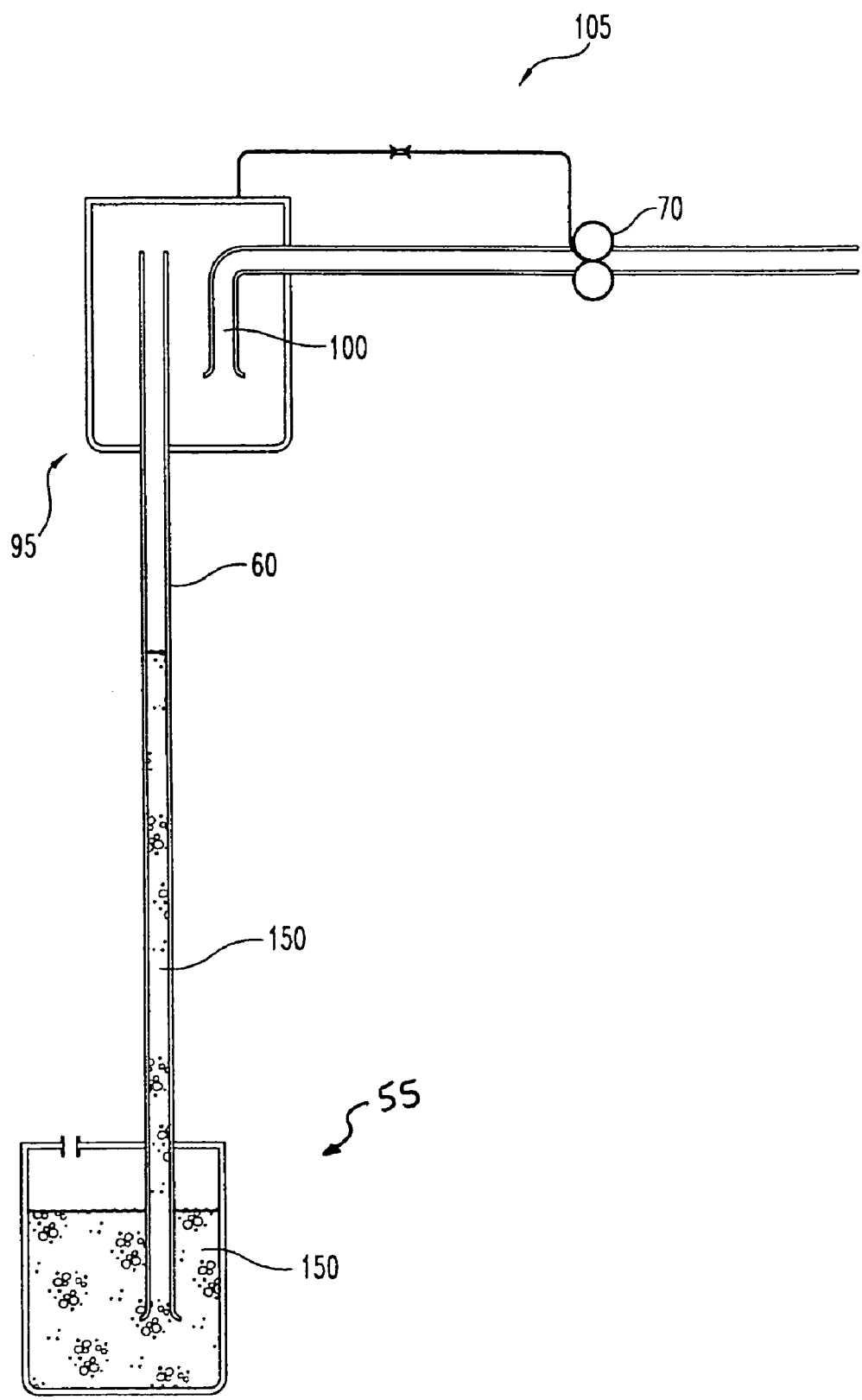
FIG. 3 is a schematic of an anti-flow interruption system configured with a fuel system during operation of a fuel pump.

FIG. 3 depicts movement in the liquid fuel 150 after the fuel pump 70 has been activated. The liquid fuel 150 is shown in the fuel line 60. Air, gas, or fuel vapor present in the reservoir 95 is withdrawn through the reservoir conduit 100 and the vapor bleed system 105. Removal of air, gas, or fuel vapor reduces the pressure of the air, gas, or fuel vapor thus permitting the liquid fuel 150 to rise through the fuel line 60, depending upon the relative pressure of air present in the fuel tank 55.

Figure 4:
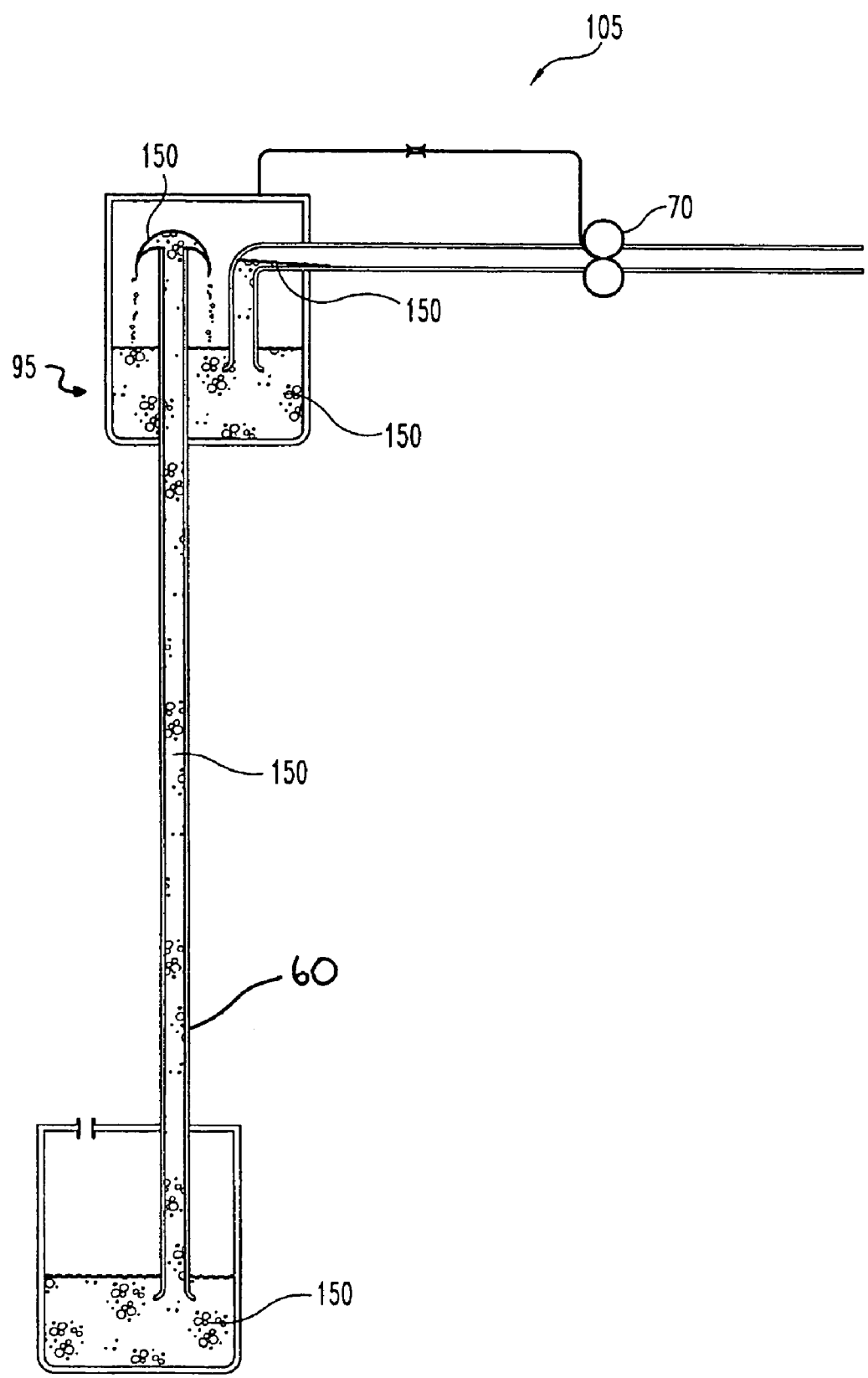
FIG. 4 is a schematic of an anti-flow interruption system configured with a fuel system during operation of a fuel pump.

FIG. 4 shows the liquid fuel 150 after it has traversed the fuel line 60 and has begun to fill the reservoir 95 and be pulled in to the reservoir conduit 100. Fuel vapor, air, or other gas is pulled out of the reservoir 95 by action of the vapor bleed system 105.

Figure 5:
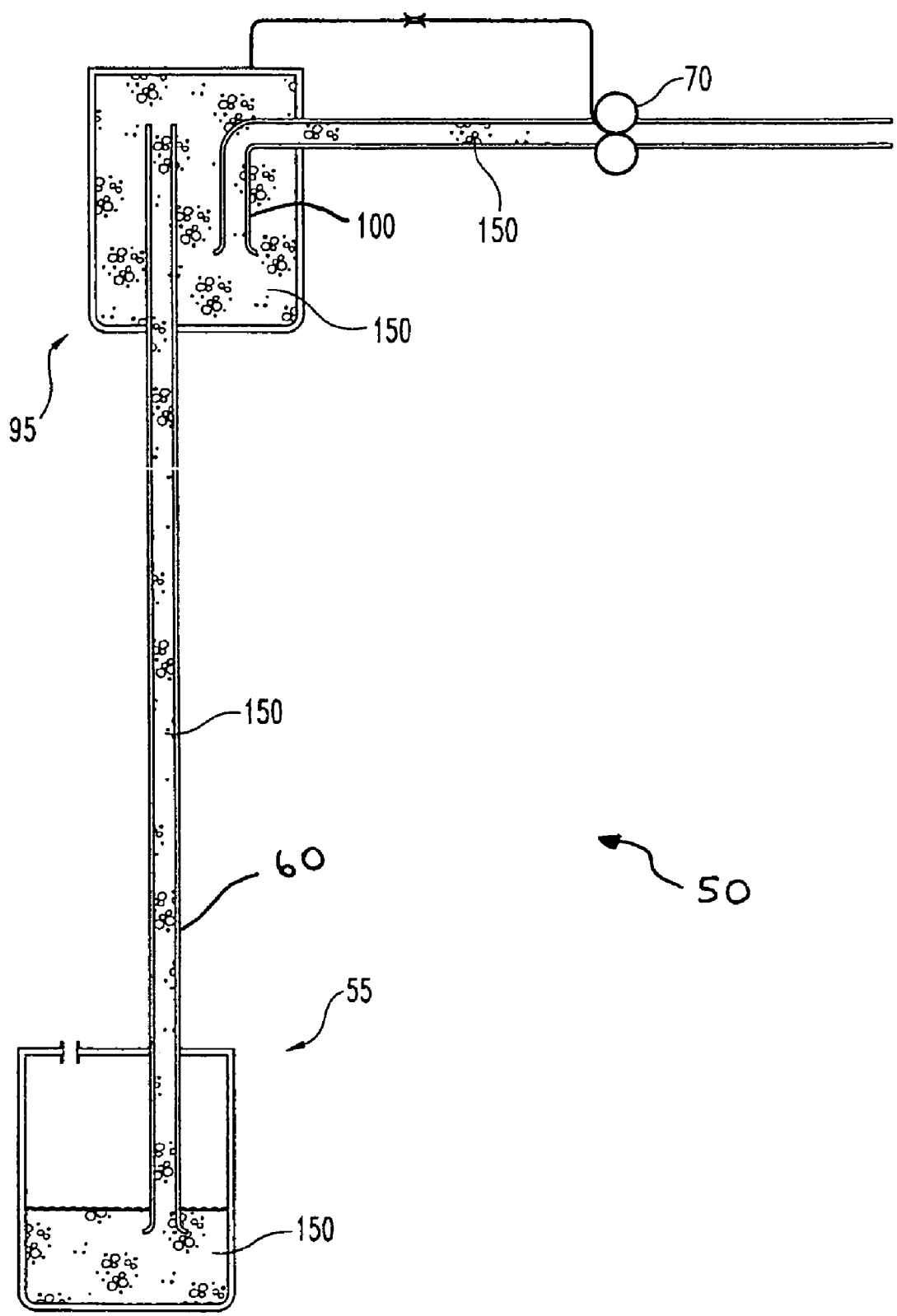
FIG. 5 is a schematic of an anti-flow interruption system configured with a fuel system during operation of a fuel pump.

FIG. 5 shows the fuel system 50 at a point in which the liquid fuel 150 has flowed from the fuel tank 55, into the fuel line 60, filled the reservoir 95, and is being pulled through the reservoir conduit 100. At this point, all air, gas, or fuel vapor has been withdrawn from the reservoir 95. In some embodiments, however, some residual amounts of air or fuel vapor may remain in the reservoir 95 depending on the geometry of the reservoir 95. For example, a depression or other type of pocket formed at the top of the reservoir 95 may trap air or fuel vapor thus preventing complete evacuation of the reservoir 95.

Figure 6:
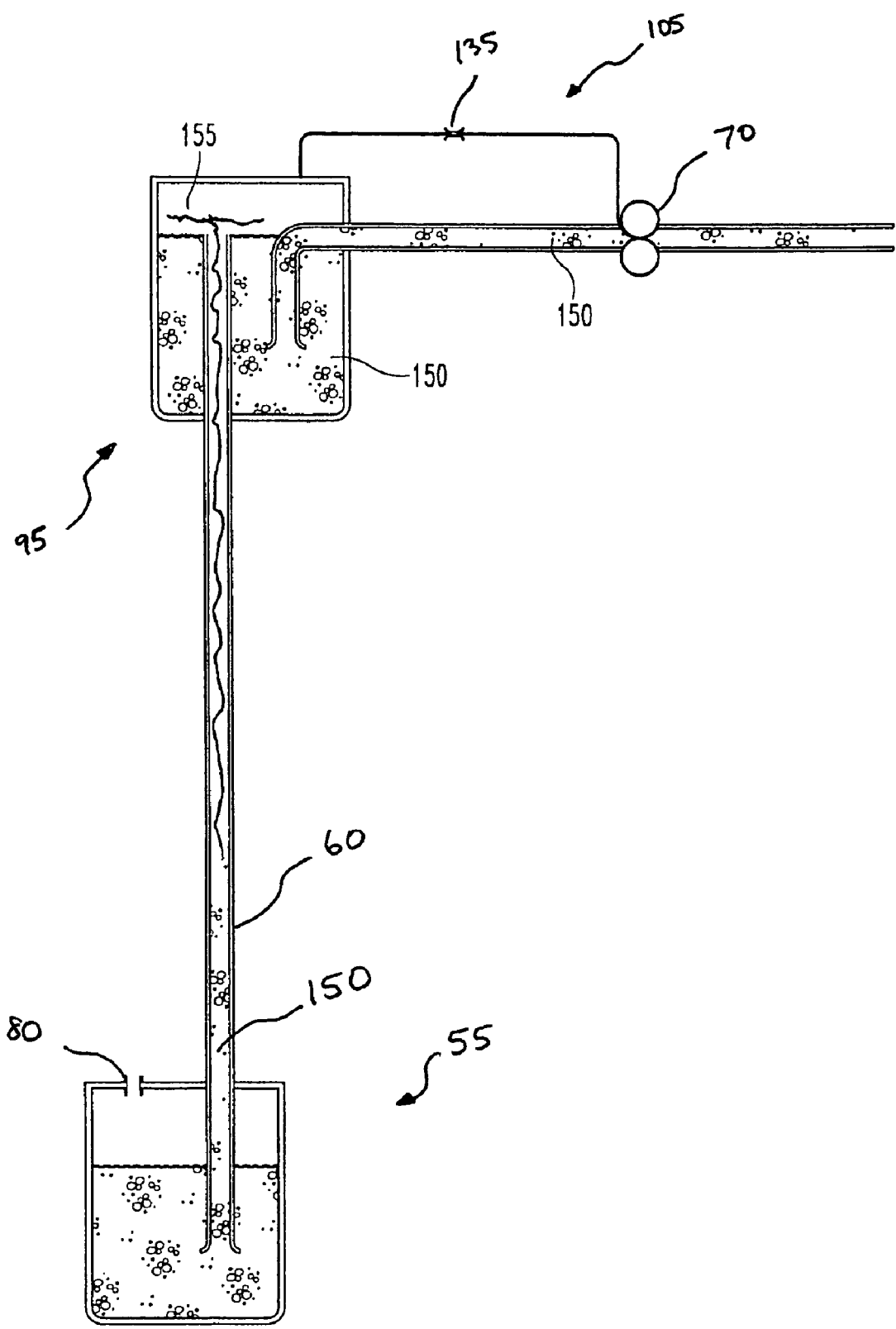
FIG. 6 is a schematic of an anti-flow interruption system configured with a fuel system during a fuel interruption.

FIG. 6 depicts an interruption in fuel flow from the fuel tank 55 which may be the result of a maneuvering aircraft at high altitudes. For example, low ambient pressures at high altitude provide less assistive lift in the fuel tank 55 in forcing the liquid fuel 150 up the fuel line 60. The fuel pump 70 must then compensate and provide enough lift to pump the liquid fuel 150. The locations in the upper most areas of the reservoir 95 may be at low pressures owing to the pump pressures required to pump fuel from the fuel tank 55 during periods of low air pressure made available to the fuel tank 55 via the fuel vent 80. In this situation, a disturbance or aircraft maneuvering which results in an incremental change in normal acceleration may cause the column of fuel in the fuel line 60 to collapse into the fuel tank 55. The liquid fuel 150 remaining in the reservoir 95 ensures an uninterrupted flow of the liquid fuel 150 to the fuel pump 70. The size of the reservoir 95 and engine fuel flow determine the length of time the maneuver can be sustained. Once the disturbance is removed and/or the maneuvering ceases, the additional downward pressure will disappear leaving only the weight of the liquid fuel to resist the flow into the reservoir 95. Depending on the difference in internal air or vapor pressure between the reservoir 95 and the fuel tank 55, the air pressure within the tank 55 may be sufficient to restore the flow of fuel into reservoir 95 causing it to be refilled. Simultaneously, and continuing until the reservoir 95 is filled to its usable capacity, the fuel vapor 155 will be drawn out of the reservoir 95 via the vapor bleed system 105, and the liquid fuel 150 will again begin to fill the reservoir 95 by pumping action of the fuel pump 70.

Many different embodiments are envisioned, for example in some embodiments the anti-flow interruption system may be employed by having two or more fuel pumps that pump fuel from a common reservoir.

In one embodiment, there is an apparatus comprising a fuel tank, a reservoir, a first fuel path having a first fuel path intake in fluid communication with the fuel reservoir and a first fuel path outlet, and a second fuel path having a second fuel path intake in fluid communication with the fuel tank and a second fuel path outlet in fluid communication with the fuel reservoir, wherein the second fuel path outlet is above the first fuel path inlet.

In another embodiment, there is an apparatus comprising a fuel reservoir, a fuel pump disposed in fluid communication with the fuel reservoir and configured to receive fuel from a first elevation within the fuel reservoir, and a fuel tank located below the fuel reservoir and disposed in fluid communication with the fuel reservoir at an elevation above the first elevation, wherein the fuel reservoir provides fuel to the fuel pump when the fuel flow is interrupted from the fuel tank.

In yet another embodiment, there is a fuel delivery system comprising a fuel tank, a fuel pump, and means for mitigating fuel flow interruption to the fuel pump when fuel flow from the fuel tank is interrupted.

In still yet another embodiment, there is a method comprising coupling a fuel passageway in fluid communication with a fuel reservoir, locating an outlet of the fuel passageway above an intake of the fuel passageway, routing a fuel supply passage from a fuel tank to the fuel reservoir, and positioning an outlet of the fuel supply passage above the intake of the fuel passageway.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An apparatus comprising:
   a fuel tank;
   a fuel reservoir;
   a fuel pump located above the fuel tank and operable to receive fuel from the fuel reservoir;
   a first fuel path having a first fuel path intake in fluid communication with the fuel reservoir and a first fuel path outlet;
   a second fuel path having a second fuel path intake in fluid communication with the fuel tank and a second fuel path outlet in fluid communication with the fuel reservoir, wherein the second fuel path outlet is above the first fuel path inlet; and
   wherein in operation the fuel pump pulls fuel through the second fuel path outlet and into the reservoir.

2. The apparatus of claim 1, the first fuel path outlet in fluid communication with the fuel pump.

3. The apparatus of claim 2, which further includes a fuel vapor bleed off in fluid communication with the fuel reservoir.

4. The apparatus of claim 3, wherein the fuel vapor bleed off is connected between the fuel reservoir and the fuel pump and operable to convey vapor from the fuel reservoir.

5. The apparatus of claim 2, which further includes a fuel tank vent to connect the interior of the fuel tank to an exterior source of air.

6. The apparatus of claim 2, which further includes an aircraft having an engine; and
   wherein the apparatus provides fuel to the engine.

7. An apparatus comprising:
   a fuel reservoir;
   a fuel pump disposed in fluid communication with the fuel reservoir and configured to receive fuel from a first elevation within the fuel reservoir; and
   a fuel tank located below the fuel reservoir and disposed in fluid communication with the fuel reservoir at an elevation above the first elevation, wherein the fuel reservoir provides fuel to the fuel pump when the fuel flow is interrupted from the fuel tank; and
   wherein the fuel pump is capable of pumping fuel through the elevation and into the second elevation when fuel is not interrupted from the fuel tank.

8. The apparatus of claim 7, wherein the fuel pump is a high lift suction fuel pump.

9. The apparatus of claim 7, which further includes a vapor bleed connected between the fuel reservoir and the fuel pump.

10. The apparatus of claim 7, which further includes a vent disposed in the fuel tank, wherein the fuel tank is vented to an exterior pressure source.

11. A fuel delivery system comprising:
    a fuel tank and a fuel container downstream of the fuel tank;
    a fuel pump to pull fuel from the fuel container; and
    means for removing vapor from the fuel container and mitigating fuel flow interruption to the fuel pump when fuel flow from the fuel tank is interrupted.

12. The fuel delivery system of claim 11, wherein the means includes a vapor bleed conduit in fluid communication between the fuel container and the fuel pump.

13. The fuel delivery system of claim 11, which further includes a fuel vent.

14. The fuel delivery system of claim 11, which further includes an aircraft having a gas turbine engine; and wherein the fuel delivery system is operable to provide fuel to the engine.

15. A method comprising:
    coupling a fuel passageway in fluid communication with a fuel reservoir;
    configuring a pump to receive fuel from a fuel reservoir through the fuel passageway;
    locating an outlet of the fuel passageway above an intake of the fuel passageway;
    routing a fuel supply passage from a relatively low height of a fuel tank to a relatively high height of the fuel reservoir; and
    positioning an outlet of the fuel supply passage above the intake of the fuel passageway.

16. The method of claim 15, which further includes installing a vapor bleed circuit.

17. The method of claim 15, which further includes connecting the fuel passageway to a fuel pump, wherein the fuel pump is a high lift suction fuel pump.

18. The apparatus of claim 1, which further includes a fuel vapor bleed off having an opening that withdraws fuel vapor from the fuel reservoir when fuel is interrupted from the fuel tank.

19. The apparatus of claim 7, which further includes a fluid passage structured to convey fuel vapor from the fuel reservoir when fuel vapor is present in the reservoir.

20. The apparatus of claim 7, wherein the fuel pump is external of the fuel reservoir.

* * * * *